(12) United States Patent
Kelley et al.

(10) Patent No.: US 11,907,993 B1
(45) Date of Patent: Feb. 20, 2024

(54) VALUE METRIC AND COMPARISON INTERFACE FOR PAYMENT CARDS

(71) Applicant: United States Automobile Association (USAA), San Antonio, TX (US)

(72) Inventors: Christopher Patrick Kelley, Austin, TX (US); Jarrod Lawrence Joplin, Austin, TX (US); Daniel Ronald Zaharia, Austin, TX (US); Carly Jean Stevens, Austin, TX (US); Sean Holstien, Irvine, CA (US); Cornelius Williams, San Antonio, TX (US); Trisha Suzanne Mock, Austin, TX (US); Elainie B. Hicks, Boerne, TX (US); Christopher Gregory, Marietta, GA (US); John Griffin, San Antonio, TX (US); Ryan Clark, Saint Augustine, FL (US); Audra Kelley, Austin, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 766 days.

(21) Appl. No.: 16/545,619

(22) Filed: Aug. 20, 2019

Related U.S. Application Data

(60) Provisional application No. 62/764,993, filed on Aug. 20, 2018.

(51) Int. Cl.
*G06Q 30/00* (2023.01)
*G06Q 30/0601* (2023.01)
(Continued)

(52) U.S. Cl.
CPC ......... *G06Q 30/0629* (2013.01); *G06Q 20/34* (2013.01); *G06Q 30/0631* (2013.01); *G06Q 40/03* (2023.01)

(58) Field of Classification Search
CPC ...................................................... G06Q 30/00
(Continued)

(56) References Cited

U.S. PATENT DOCUMENTS 8,799,148 B2 * 8/2014 Chandran .............. G06Q 40/02
705/38
10,296,897 B1 * 5/2019 Wu ....................... G06Q 20/348
(Continued)

FOREIGN PATENT DOCUMENTS

WO   WO-2018039377 A1 *  3/2018   ....... G06F 16/90335

OTHER PUBLICATIONS

Kiernan, John, "Credit Card Rewards Guide", WalletHub.com, dated Apr. 2, 2009. (Year: 2009).*

(Continued)

*Primary Examiner* — Mark A Fadok
(74) *Attorney, Agent, or Firm* — Fish & Richardson P.C.

(57) ABSTRACT

Techniques are described for determining a value metric for each of a plurality of payment cards, and recommending payment card(s) based on their respective value metrics. Implementations provide a recommendation engine that analyzes user data and card data, and recommends payment card(s) that may be suitable for a user. The engine consumes usage data and credit score and uses that information, along with characteristics of various available cards, to develop a value metric for each payment card that indicates how valuable owning the card would be to the particular user, such as how much money the user can expect to make or lose every year if they use the card as indicated, given the card's interest rate, rewards, fees, and so forth. The engine can rank the cards according to their value metrics, and the top-ranked card(s) are presented to the user as recommendations in a user interface.

21 Claims, 5 Drawing Sheets

(51) Int. Cl.
*G06Q 20/34* (2012.01)
*G06Q 40/03* (2023.01)

(58) Field of Classification Search
USPC ...................................................... 705/26.64
See application file for complete search history.

(56) References Cited

U.S. PATENT DOCUMENTS

| | | | | |
|---|---|---|---|---|
| 10,853,791 | B1* | 12/2020 | Ellis | G06Q 20/3672 |
| 11,315,179 | B1* | 4/2022 | Rehder | G06Q 30/0226 |
| 2010/0082445 | A1* | 4/2010 | Hodge | G06Q 20/20 |
| | | | | 705/35 |
| 2016/0086222 | A1* | 3/2016 | Kurapati | G06Q 40/08 |
| | | | | 705/14.53 |
| 2016/0232546 | A1* | 8/2016 | Ranft | G06Q 40/025 |
| 2021/0027357 | A1* | 1/2021 | Bonfigli | G06Q 30/0627 |

OTHER PUBLICATIONS

Stackoverflow, "Persistent data in webapp—stack overflow", Stackoverflow.com, dated Jan. 18, 2011. (Year: 2011).*

* cited by examiner

VALUE METRIC AND COMPARISON INTERFACE FOR PAYMENT CARDS

CROSS-REFERENCE TO RELATED APPLICATION

This application claims priority under 35 U.S.C. § 119 to U.S. application Ser. No. 62/764,993, filed on Aug. 20, 2018, and entitled "Value Metric and Comparison Interface For Payment Cards," the entire contents of which is incorporated by reference herein.

BACKGROUND

Payment cards such as credit cards and debit cards are ubiquitous in a modern economy. Individuals may use a payment card to make purchases from traditional brick-and-mortar merchants and also to conduct transactions online through e-commerce web sites or other services. Given the large number of cards that may be available, an individual or other entity may have difficulty determining the particular card that is appropriate for their purchasing needs and overall financial situation.

SUMMARY

Implementations of the present disclosure are generally directed to account management. More specifically, implementations are directed to determining value metrics for multiple payments cards, based on user-indicated expected use of the card and other information, recommending one or more cards for an individual, and presenting the recommendations through a user interface such that the recommendations are displayed (e.g., follow the individual) as the individual views multiple pages in the user interface such as a web application, mobile application, and so forth.

In general, innovative aspects of the subject matter described in this specification can be embodied in methods that include operations of: receiving user data associated with a user accessing an application executing on a user device; calculating a value metric for each of a plurality of payment cards, the respective value metric of a payment card indicating an estimated value of using the respective payment card, the respective value metric based at least partly on the user data and one or more characteristics of the respective payment card; ranking the plurality of payment cards according to their respective value metrics and, based at least partly on the ranking, designating at least one recommended payment card that is highest ranked among the plurality of payment cards; and presenting recommendation data indicating the at least one recommended payment card to the user on multiple screens of the application.

Implementations can optionally include one or more of the following features: the user data includes a credit score of the user, an estimate of expenditures to be made by the user through use of the payment card during a time period, and an estimate of a payoff amount to be paid on the payment card during the time period; one or more of the credit score, the estimate of expenditures, and the estimate of the payoff are provided by the user through the application; the credit score is retrieved from an external service; the one or more characteristics of the respective payment card include one or more of a reward earned through use of the respective payment card, an interest rate of the respective payment card, and a fee charged for use of the respective payment card; the operations further include presenting card data for each of the plurality of payment cards in the multiple screens of the application; presenting the recommendation data includes presenting a recommendation indicator with the respective card data of each recommended payment card; the respective card data for each of the plurality of payment cards includes the respective value metric calculated for the respective payment card; presenting the recommendation data further includes presenting, in at least one screen of the application, a comparison of the one or more characteristics of the at least one recommended payment card to the one or more characteristics of at least one other payment card; the operations further include receiving, through the application, an indication of the at least one other payment card to be compared to the at least one recommended payment card; and/or the presented comparison further includes the value metric of the at least one recommended payment card and the value metric of the at least one other payment card.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following technical advantages and/or technical improvements over previously available solutions. Implementations provide an efficient way to view data regarding different payment cards, and determine card recommendations for a user based on quantified information regarding the user's expected use of the card, the user's credit score, and the characteristics of the card (e.g., interest rate, rewards, fees, etc.). Through use of such information, implementations develop useful recommendations to help efficiently determine a suitable payment card. Previously available solutions lack an integrated recommendation service that is based on such quantified information, and accordingly user's employing previously available solutions may spend more time determining an appropriate card, and/or more frequently perform erroneous and/or later-backed-out requests. Accordingly, previously available solutions tend to expend more processing power, storage space, active memory, network bandwidth, and/or other computing resources compared to a system according to the implementations described herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are directed to systems, devices, methods, and computer-readable media for determining a value metric for each of a plurality of payment cards that are available to a user, and recommending one or more of the payment cards to the user based on their respective value metrics. Implementations provide a recommendation engine that analyzes user data and card data, and recommends one or more payment cards that may be suitable for a user. To recommend a suitable card for the customer, the engine collects information from the user regarding their intended use of the card, such as how much they intend to spend on the card each month in various categories (food, fuel, etc.), and how much balance they intend to carry from month to month. The engine also retrieves the user's credit score. The engine consumes the user-provided usage data and credit score and uses that information, along with characteristics of various available cards (e.g., interest rate, annual fees, rewards, etc.), to develop a value metric for each of the payment cards. In some examples, the value metric indicates how valuable owning the card would be to the particular user, such as how much money the user can expect to make or lose every year if they use the card as they indicated, given the card's interest rate, rewards, fees, and so forth. The engine can rank the cards according to their value metrics, and the top-ranked card(s) are presented to the user as recommendations in a user interface (UI) of an application.

In some implementations, the recommendations for payment cards are presented to the user in multiple screens of the UI provided by the application. In this manner, implementations provide a solution in which the recommendations can be presented to the user (e.g., follow the user around) as they navigate the various screens (e.g., pages, sections, etc.) of the application. For example, the user can be presented with an indication of the recommended payment cards on multiple pages while browsing or shopping for payment cards, while they are logged into the application during a particular session. In some implementations, the recommendation information is persisted and presented across different sessions which may involve different platforms. For example, the user may begin interacting with the application as a web application and view the recommended cards there, then log out, log in the next day on a mobile application (app), and view the same recommendation information as the previous day. In some implementations, the application may also provide a side-by-side comparison feature (e.g., in the form of a carousel control) to let the user readily compare different payment card characteristics (e.g., interest rate, fees, rewards) and value metrics with the different payment cards, with the recommended payment card(s) indicated in the comparison as well.

Figure 1:
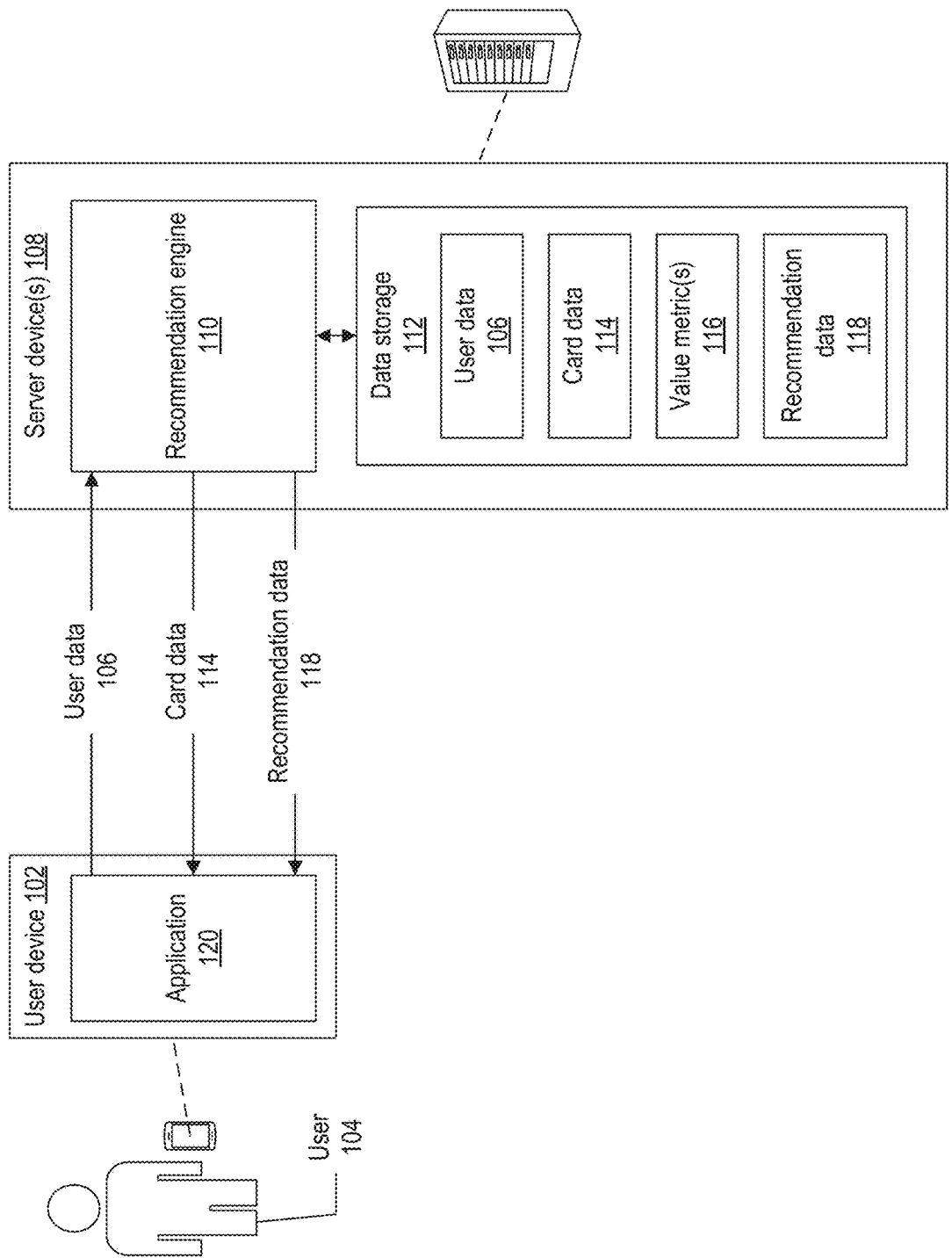
FIG. 1 depicts an example system, according to implementations of the present disclosure.

FIG. 1 depicts an example system, according to implementations of the present disclosure. As shown in the example of FIG. 1, a user device 102 may be operated by a user 104. The user device 102 may be any suitable type of computing device. In some instances, the user device 102 is a portable (e.g., mobile) computing device such as a smartphone, wearable computing device, tablet computer, and so forth. The user device 102 may also be a less portable type of computing device such as a desktop computer, laptop computer, and so forth. The user device 102 may execute an application that is provides various features for managing ghost account(s) as described further below. The user 104 of the user device 104 can use an application 120 executing on the user device 104.

The application 120 may communicate, over one or more networks, with one or more server devices 108. The server device(s) 108 may include any suitable number and type of computing device(s), included distributed computing server(s) (e.g., cloud computing server(s)). In some implementations, the server device(s) 108 execute a recommendation engine 110 that analyzes data and develops recommendation data 118 for a user 104. The recommendation data 118 can identify one or more payment cards that are recommended for the user 104. The user 104 can employ the application 120 to provide (e.g., through the UI of the application) user data 106. For example, the user 104 can provide expenditure information describing the user's expected expenditures (e.g., each month) through the payment card. In some examples, the UI may prompt the user 104 to enter their estimated expenditures for various categories of goods and services, such as expected amounts to be spent each month on food, fuel, travel, and/or other categories. The user data 106 can also include the amount that the user 104 expects to pay off on the payment card each month, and/or the balance that the user 104 expects to carry each month. The user data 106 can also include the user's current credit score, as determined by one or more credit reporting agencies. In some instances, the user 104 provides their credit score through the UI of the application 120, as a particular credit score or a range of scores that the user falls within. Alternatively, the recommendation engine 110 can retrieve the user's credit score (e.g., through a soft pull) from a suitable external service, such as a credit reporting agency API.

The engine 110 can use the user data 106 and card data 114 to determine the recommendation data 118. The card data 114 can describe one or more characteristics for each of the payment cards being considered by the user 104. Such characteristics can include fees associated with the card (e.g., annual fees), interest rate for balances carried on the card (e.g., APR), and/or rewards that the user 104 can earn by using the card for purchases (e.g., airline miles, merchant discounts, cash back on purchases, access to travel promotions, etc.). Based on the user's expected usage of the card (e.g., monthly expenditures in various categories), the balance that may be carried, the interest rate on that balance, the (e.g., annual) fees for the card, and the value of the rewards that the user can expected to earn from the card, the engine 110 can determine a value metric 116 for each of the cards. The value metric 116 may be described as a total cost (or profit) that the user 104 is expected to incur through use of the card (e.g., over a one-year period). For example, the value metric 116 for a card may be the monetary value of expected rewards over the course of a year, minus the sum of interest paid and fees for that year.

The engine 110 can rank the various cards according to their respective value metrics 116. In some examples, the cards that are ranked (and for which metrics are determined) are those cards that have been designated by the user through the application 120 as being of interest to the user 104 (e.g., cards that the user may wish to apply for). In some examples, the ranked cards are those that are provided by a financial institution associated with the server device(s) 108. The top-ranked one or more cards are designated as recommended cards for the user 104. In some examples, the top one, two, or three cards are listed as recommended cards, and indicated in the recommendation data 118. The recommendation data 118 can be communicated to the user device 102 and presented in the UI of the application 120. In some instances, the user data 106, card data 114, value metric(s) 116, and/or recommendation data 118 are stored in data storage 112 on the server device(s) 108 and/or elsewhere, to be accessible by the recommendation engine 110.

The recommendation data 118 can be presented to the user through the UI of the application in any suitable number of screens of the application UI, such that the recommendations follow the user 104 as they navigate through multiple screens of the UI while browsing or shopping for payment cards to apply for. In this way, the recommendation information can be integrated throughout an entire user experience and can flow through the user experience during that particular session or, in some implementations, across different sessions. For example, when browsing different cards on various screens, the card data 114 for each presented card can be presented with the value metric 116 that has been calculated for the user for that particular card, and the card data 114 can also be presented with a visual indication whether the particular card is recommended for the user. In some implementations, the recommended card(s) can be flagged with a recommendation indicator that is shown wherever the recommended card(s) information is displayed on the various screens of the application. In some instances, when viewing multiple cards' data on a screen, the recommended card(s) may be placed prominently, such as at the beginning and/or top of a list of cards.

In some implementations, the application UI can also provide one or more screens for comparison of the characteristics and/or value metrics of different cards. For example, the user 104 can use the application 120 to designate multiple cards to be compared. A comparison screen can show a side-by-side comparison (e.g., of up to five cards at a time), in which the characteristics (e.g., interest rate, rewards, fees) and value metrics of the cards are shown side-by-side, to facilitate the user's decision of which card is best suited to their needs. The recommended card(s) can be indicated on the comparison screens as well. In some implementations, the presentation of the card data can include one or more credit levels for which card applications are typically approved. For example, the application 120 may show a particular card and indicate that card is generally approved for applicants with an excellent credit level.

The application 120 can be any suitable type of application, including but not limited to mobile applications or other native applications designed to run on a particular hardware architecture, and/or web applications designed to run within a web browser or other suitable container for rendering web content. The server device(s) 108 can include any suitable number and type of application server(s), web server(s), and so forth that provide the application 120 and serve it for presentation on the user device 102. In some implementations, the server device(s) 108 employ a containerization and/or microservice architecture to provide the application and the information presented therein. The application can be provided as a RESTful service.

Figure 2:
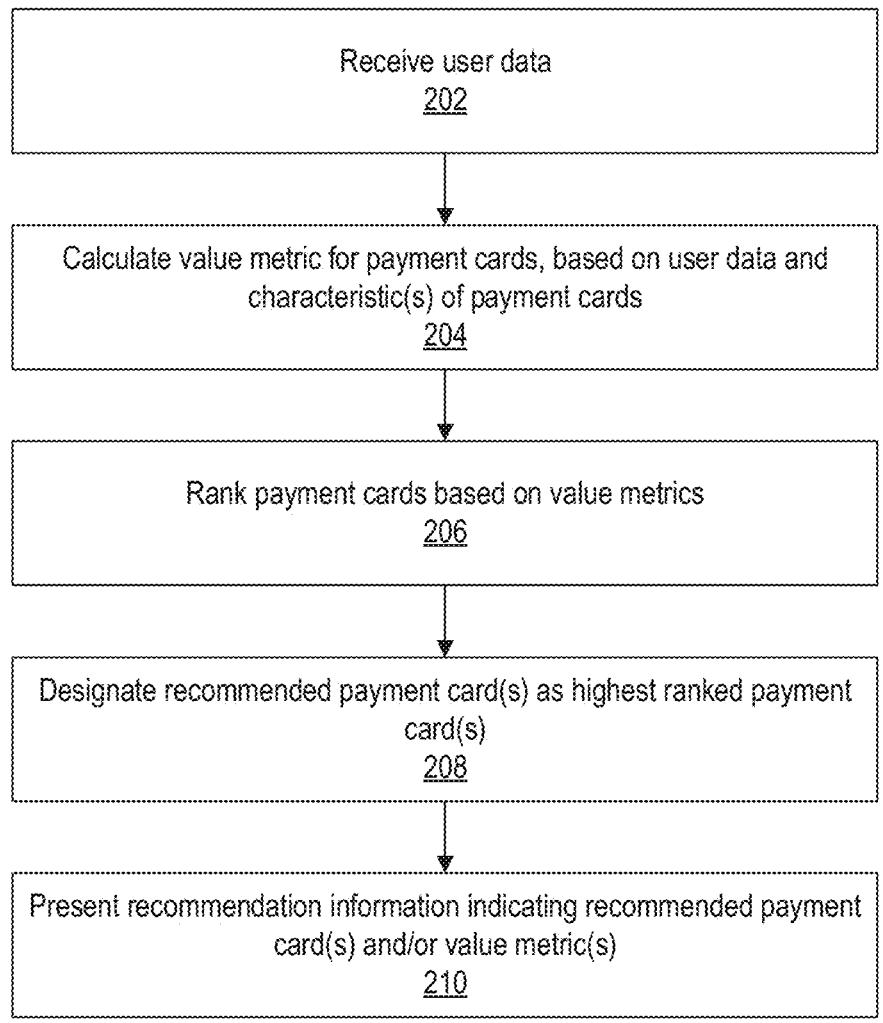
FIG. 2 depicts a flow diagram of an example process, according to implementations of the present disclosure.

FIG. 2 depicts a flow diagram of an example process, according to implementations of the present disclosure. Operations of the process can be performed by one or more of the application 120, the recommendation engine 110, and/or other software module(s) executing on the user device 102, the server device(s) 108, or elsewhere.

The user data 106 for a particular user 104 is received (202). As described above, the user data 106 can include, but is not limited to, the user's expected monthly expenditures in various categories, the amount that the user expects to pay on the card each month, and the user's credit score (e.g., self-reported or retrieved directly from a credit reporting agency). A value metric 116 is calculated (204) for each of the payment cards under consideration. As described above, the value metric 116 is determined based on the user data 106 and the card data 114 for each card, such as the card's interest rate, fees, rewards, and so forth. The payment cards can be ranked (206) based on their value metrics. One or more of the payment cards can be designated (208) as recommended payment cards, based on their respective value metrics. For example, the top-ranked N number of cards (e.g., N=2) can be designated as recommended cards for the user 104. The recommendation information, indicating the recommended card(s), can be presented (210) in the UI of the application 120, across various screens as described above.

Users often have difficulty finding payment cards that are right for their financial situation and for which they are qualified. Implementations provide value metrics as quantified advice to a user to assist them in their decision of the appropriate card, and provide recommendations to further assist the user. In this way, implementations provide a credit card storefront that provides recommended applicant payment cards, a rewards estimate based on credit score and spending habits of the user, a visualization of the rewards estimate, the use of a soft pull of the credit score for the card recommendations, and a presentation of interest mitigation advice. For each card, the user can view how their spending can generate positive value (e.g., rewards) or negative value (e.g., interest payments). This can assist users in making better financial decisions.

Figure 3:
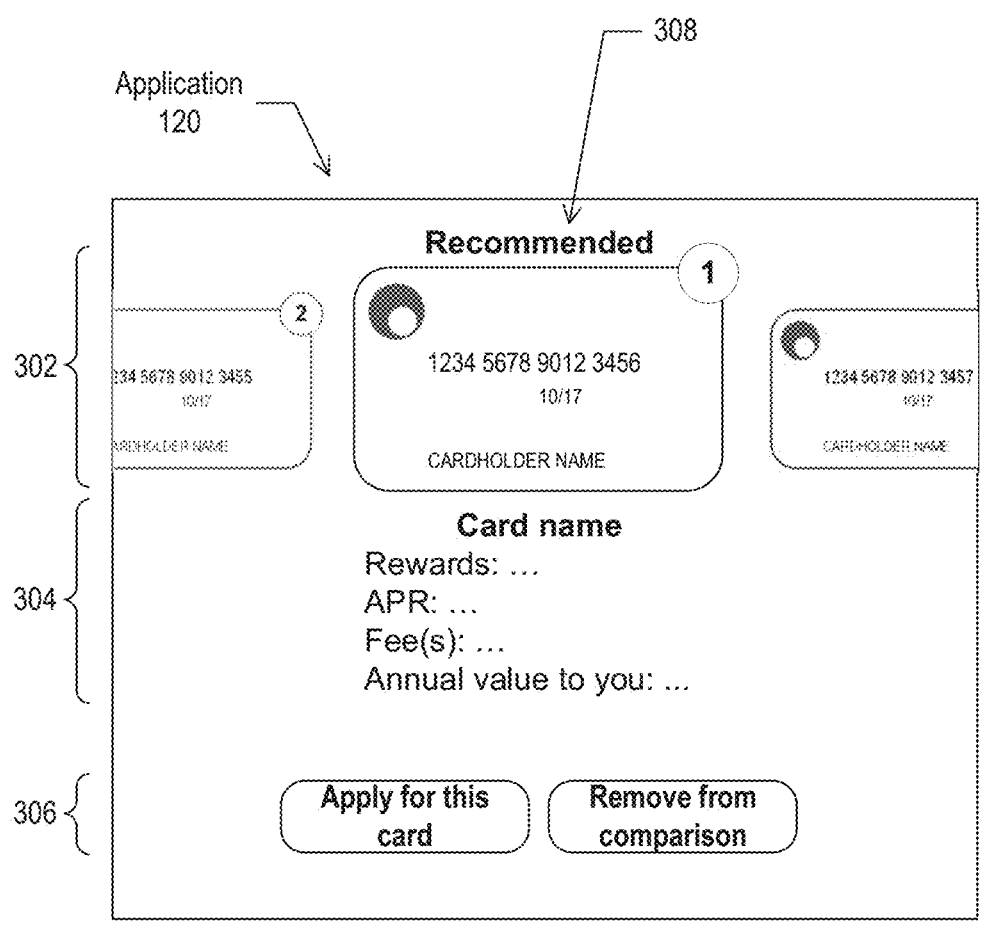
FIGS. 3 and 4 depict example user interfaces, according to implementations of the present disclosure.
Figure 4:
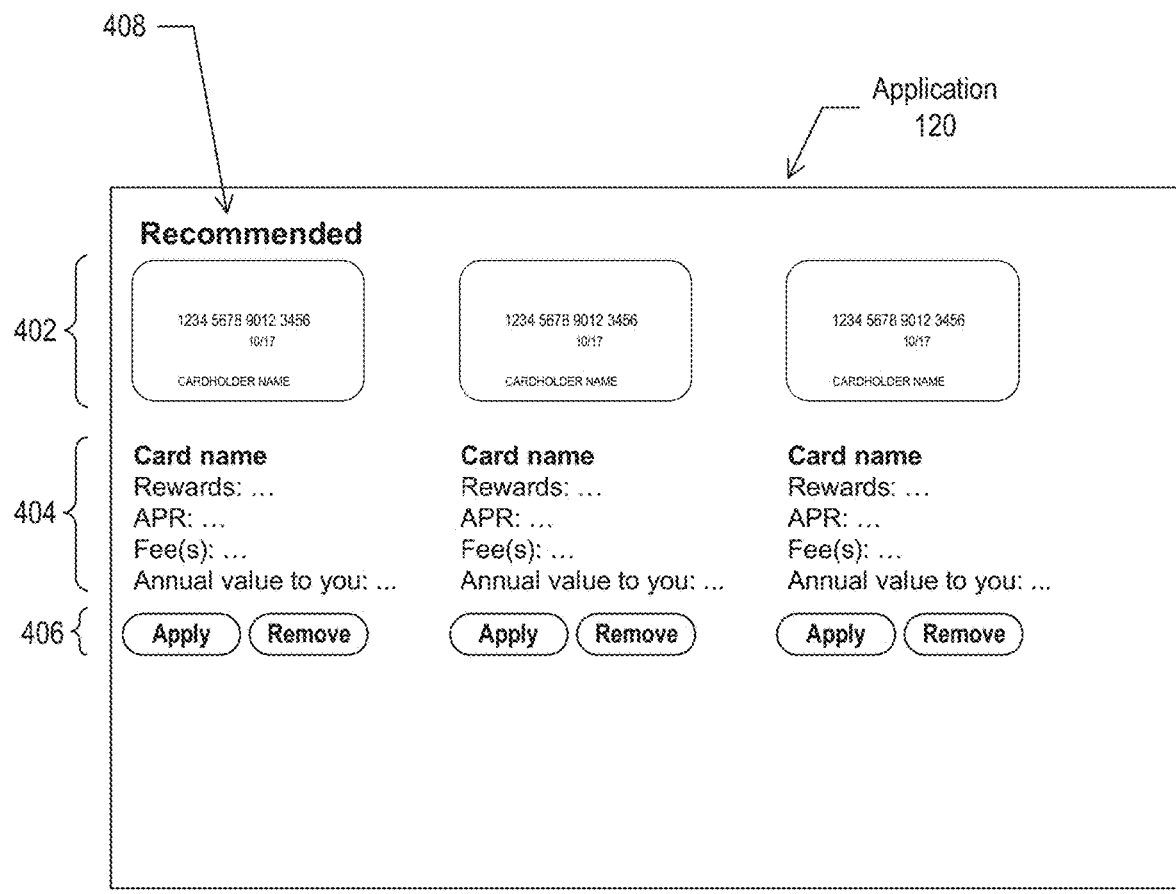

FIGS. 3 and 4 depict example UIs that may be presented by the application 120. FIG. 3 shows an example of a carousel-style presentation of various cards for comparison. In this example, the comparison screen includes a section 302 that includes a carousel control. The user can swipe left or right in the carousel control to select a card among the multiple cards that are available or otherwise under consideration. The screen includes a section 304 that shows, for the selected card, the card data. The presented card data can include a name of the card (e.g., the financial institution providing the card and name of the particular card). The presented card data can also include the various characteristics of the card, such as the interest rate (e.g., APR), the fee(s) associated with the card, the reward(s) associated with the card, and so forth. In some implementations, the presented card data includes the value metric calculated for the card (e.g., "Annual value to you"). In this way, implementations can provide the user with a transparent view in the particular, quantified value proposition associated with each card, such as how much the user can expect to lose or gain overall each year through use of the card. The screen can also include controls 306 (e.g., links, buttons, etc.) that enable the user to apply for the currently selected card, or remove the currently selected card from the comparison deck.

The screen can also include an indicator 308 that indicates the particular card(s) that are recommended cards. The indicator 308 can be text, as shown in the example. The indicator 308 can also be in any other suitable form, such as an icon, symbol, graphic, color, highlighting, and so forth.

FIG. 4 shows another example of a UI screen that may be used for comparison of different cards. In this example, the screen includes a section 402 that is a graphic of each card being compared. A section 404 can display the card data for each card as described above. Controls 406 can be used by apply for the card or remove the card from the comparison deck. An indicator 408 can indicate those card(s) that are recommended for the user, as described above.

In some implementations, the value metric shown in the screens can provide additional detail (e.g., a breakdown) of the various components of the value metric. For example, the total value metric can be shown along with the negative value (e.g., fees and expected interest payments) and positive value (e.g., value of rewards) that are the components of the total value metric. The information shown on the screens can also be presented with suitable explanatory information, explaining the meaning of each displayed element and/or links to allow the navigate to navigate to other screens for further explanation.

Access to the application 120 can be granted to a user following a successful authentication of that user. Authentication can be based on one or more authentication modes, such as provided credentials (e.g., username, password, passphrase, passcode, personal identification number, etc.), biometric data (e.g., fingerprint, facial recognition, voiceprint recognition, etc.), and so forth.

Figure 5:
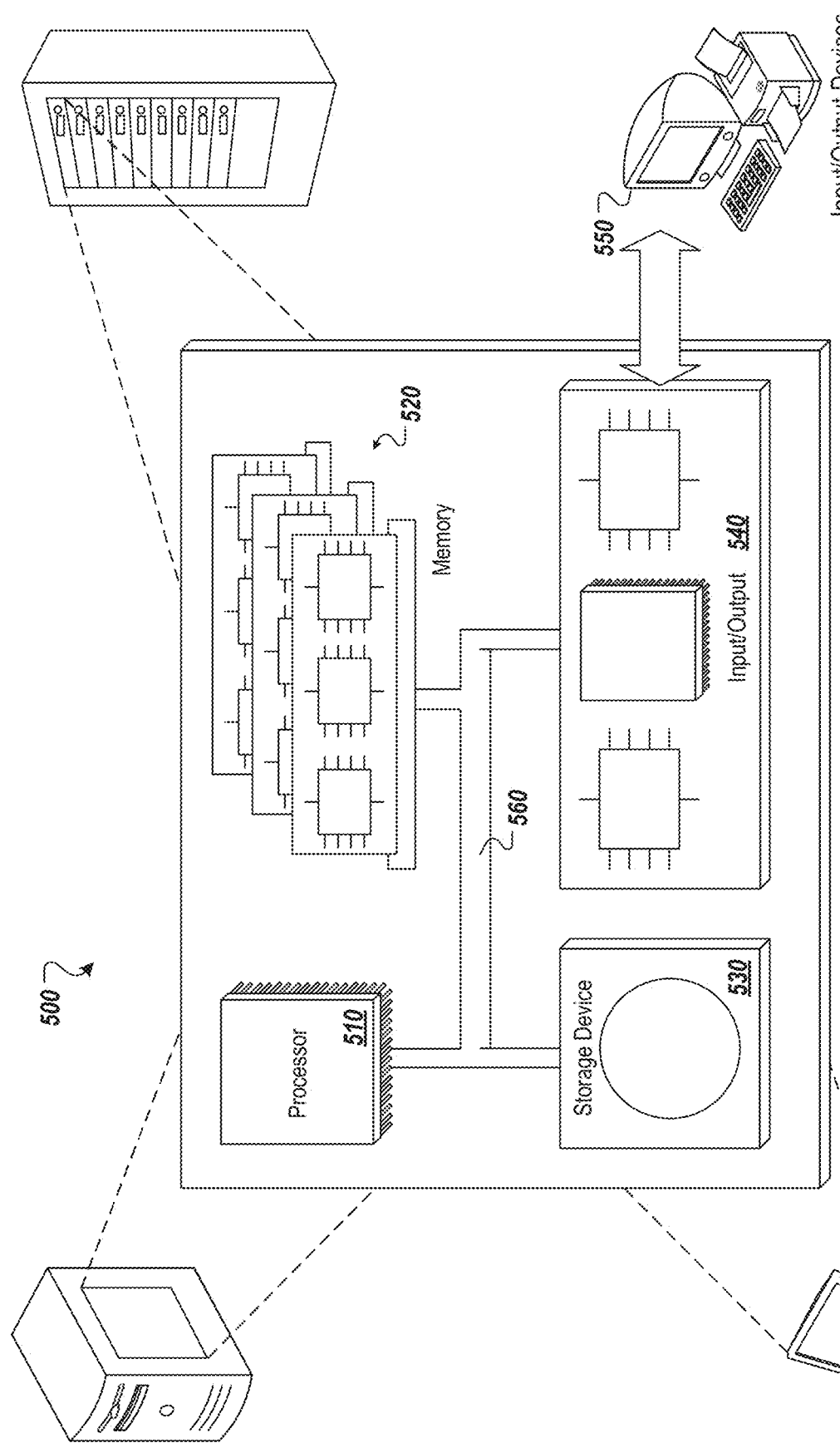
FIG. 5 depicts an example computing system, according to implementations of the present disclosure.

FIG. 5 depicts an example computing system, according to implementations of the present disclosure. The system 500 may be used for any of the operations described with respect to the various implementations discussed herein. For example, the system 500 may be included, at least in part, in one or more of the user device 102, the server device(s) 108, and/or other computing device(s) described herein. The system 500 may include one or more processors 510, a memory 520, one or more storage devices 530, and one or more input/output (I/O) devices 550 controllable through one or more I/O interfaces 540. The various components 510, 520, 530, 540, or 550 may be interconnected through at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more networks using any network protocol.

Computing devices of the system 500 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method performed by at least one processor, the method comprising:
    receiving, by the at least one processor, user data associated with a user accessing an application executing on a user device;
    calculating, by the at least one processor, a value metric for each of a plurality of payment cards, each respective value metric of a payment card indicating an estimated value of using a respective payment card of the plurality of payment cards, the respective value metric based at least partly on the user data and one or more characteristics of the respective payment card;
    ranking, by the at least one processor, the plurality of payment cards according to their respective value metrics and, based at least partly on the ranking, designating at least one recommended payment card that is highest ranked among the plurality of payment cards; and
    presenting, by the at least one processor and in multiple sections of the application, the plurality of payment cards and recommendation data indicating the at least one recommended payment card to the user, wherein the presentation of the plurality of payment cards includes at least one control to remove a particular payment card from the plurality of payment cards, and wherein the recommendation data is preserved through one or more application logout events.

2. The method of claim 1, wherein the user data includes:
    a credit score of the user;
    an estimate of expenditures to be made by the user through use of the payment card during a time period; and
    an estimate of a payoff amount to be paid on the payment card during the time period.

3. The method of claim 2, wherein one or more of the credit score, the estimate of expenditures, and the estimate of the payoff are provided by the user through the application.

4. The method of claim 1, wherein the one or more characteristics of the respective payment card include one or more of:
    a reward earned through use of the respective payment card;
    an interest rate of the respective payment card; and
    a fee charged for use of the respective payment card.

5. The method of claim 1, further comprising:
    presenting, by the at least one processor, card data for each of the plurality of payment cards in the multiple sections of the application,
    wherein presenting the recommendation data includes presenting a recommendation indicator with respective card data of each recommended payment card.

6. The method of claim 1, wherein presenting the recommendation data further includes presenting, in at least one screen of the application, a comparison of the one or more characteristics of the at least one recommended payment card to the one or more characteristics of at least one other payment card.

7. The method of claim 6, further comprising:
    receiving, by the at least one processor, through the application, an indication of the at least one other payment card to be compared to the at least one recommended payment card.

8. The method of claim 6, wherein the presented comparison further includes the value metric of the at least one recommended payment card and the value metric of the at least one other payment card.

9. The method of claim 1, wherein the recommendation data persists across multiple different sessions of the application, each session being separated by a logout event, such that recommendations follow the user's navigation through multiple screens of the application over multiple sessions.

10. The method of claim 1, wherein calculating the value metric for each of the plurality of payment cards comprises, for each value metric, evaluating expected usage of the payment card by the user among multiple expense categories, values of one or more rewards expected to be earned through the expected usage of the payment card, an expected balance to be carried on the payment card, an interest rate of the card, and fees for the payment card.

11. The method of claim 1, wherein presenting the recommendation data in multiple sections of the application comprises presenting the recommendation data in combination with different browsing data present in each section of the application.

12. The method of claim 1, wherein presentation of the recommendation data further comprises presenting one or more hyperlinks to resources describing the respective value metrics included in the recommendation data.

13. The method of claim 1, wherein presentation of the plurality of payment cards further comprises a carousel control that permits a user to cycle between displays of individual payment cards while giving the perception of a rotating display.

14. A system comprising:
at least one processor; and
memory communicatively coupled to the at least one processor, the memory storing instructions which, when executed by the at least one processor, cause the at least one processor to perform operations comprising:
receiving user data associated with a user accessing an application executing on a user device;
calculating a value metric for each of a plurality of payment cards, each respective value metric of a payment card indicating an estimated value of using a respective payment card of the plurality of payment cards, the respective value metric based at least partly on the user data and one or more characteristics of the respective payment card;
ranking the plurality of payment cards according to their respective value metrics and, based at least partly on the ranking, designating at least one recommended payment card that is highest ranked among the plurality of payment cards; and
presenting the plurality of payment cards and recommendation data indicating the at least one recommended payment card to the user in multiple sections of the application;
wherein the presentation of the plurality of payment cards includes at least one control to remove a particular payment card from the plurality of payment cards, and wherein the recommendation data is preserved through one or more application logout events.

15. The system of claim 14, wherein the user data includes:
a credit score of the user;
an estimate of expenditures to be made by the user through use of the payment card during a time period; and
an estimate of a payoff amount to be paid on the payment card during the time period.

16. The system of claim 15, wherein one or more of the credit score, the estimate of expenditures, and the estimate of the payoff are provided by the user through the application.

17. The system of claim 14, wherein the one or more characteristics of the respective payment card include one or more of:
a reward earned through use of the respective payment card;
an interest rate of the respective payment card; and
a fee charged for use of the respective payment card.

18. The system of claim 14, the operations further comprising:
presenting card data for each of the plurality of payment cards in the multiple sections of the application,
wherein presenting the recommendation data includes presenting a recommendation indicator with respective card data of each recommended payment card.

19. The system of claim 14, wherein presenting the recommendation data further includes presenting, in at least one screen of the application, a comparison of the one or more characteristics of the at least one recommended payment card to the one or more characteristics of at least one other payment card.

20. The system of claim 19, wherein the presented comparison further includes the value metric of the at least one recommended payment card and the value metric of the at least one other payment card.

21. One or more computer-readable storage media storing instructions which, when executed by at least one processor, cause the at least one processor to perform operations comprising:
receiving user data associated with a user accessing an application executing on a user device;
calculating a value metric for each of a plurality of payment cards, each respective value metric of a payment card indicating an estimated value of using a respective payment card of the plurality of payment cards, the respective value metric based at least partly on the user data and one or more characteristics of the respective payment card;
ranking the plurality of payment cards according to their respective value metrics and, based at least partly on the ranking, designating at least one recommended payment card that is highest ranked among the plurality of payment cards; and
presenting the plurality of payment cards and recommendation data indicating the at least one recommended payment card to the user in multiple sections of the application;
wherein the presentation of the plurality of payment cards includes at least one control to remove a particular payment card from the plurality of payment cards, and wherein the recommendation data is preserved through one or more application logout events.

* * * * *